(12) United States Patent
Stevens et al.

(10) Patent No.: US 7,609,662 B2
(45) Date of Patent: Oct. 27, 2009

(54) DOT-TAG VISIBILITY IP PROTOCOL

(75) Inventors: John K. Stevens, Stratham, NH (US); Paul Waterhouse, Selkirk (CA); David Cramer, Orangeville (CA)

(73) Assignee: Visible Assets, Inc, Mississauga, Ontario (CA)

( * ) Notice: Subject to any disclaimer, the term of this patent is extended or adjusted under 35 U.S.C. 154(b) by 484 days.

(21) Appl. No.: 11/610,128

(22) Filed: Dec. 13, 2006

(65) Prior Publication Data
US 2008/0039126 A1     Feb. 14, 2008

Related U.S. Application Data

(60) Provisional application No. 60/743,030, filed on Dec. 13, 2005.

(51) Int. Cl.
*H04B 7/00* (2006.01)
(52) U.S. Cl. .................. 370/310; 370/328; 370/338; 455/456.1; 340/572.1

(58) Field of Classification Search .................. 370/310, 370/328, 338; 455/456.1; 340/572.1
See application file for complete search history.

(56) References Cited

U.S. PATENT DOCUMENTS

| 7,307,990 | B2 * | 12/2007 | Rosen et al. ............. 370/392 |
| 2007/0096875 | A1 | 5/2007 | Waterhouse et al. |
| 2007/0115132 | A1 | 5/2007 | August et al. |
| 2007/0120649 | A1 | 5/2007 | Stevens et al. |

* cited by examiner

*Primary Examiner*—Nghi H Ly
(74) *Attorney, Agent, or Firm*—Larson & Anderson, LLC

(57) ABSTRACT

The system employs full transceivers, each having peer-to-peer, client/server, and IP networking capabilities, and covering open-area ranges of up to 100 feet. The system uses Low Frequency for data communications so it can achieve both low cost (less costly than many RF-ID tags) and long battery life (10-15 years). Additionally, since these tags have batteries, static RAM maybe be added at very low cost, as well as sensors, LED's displays etc.

6 Claims, 12 Drawing Sheets

DOT-TAG VISIBILITY IP PROTOCOL

This application claims priority from U.S. application No. 60/743,030 filed Dec. 13, 2005, which application is incorporated herein by reference for all purposes.

BACKGROUND

It is not easy to provide worldwide and arbitrarily scalable visibility of radio tags.

Prior-art systems use fixed tag IDs and require prodigious database resources available at all times to be able to interpret the meaning of a fixed-ID tag.

Such systems require that all tags in a given area be interrogated in order to discern whether a particular tag of interest happens to be in the given area.

SUMMARY OF THE INVENTION

The inventive system employs full transceivers, each having peer-to-peer, client/server, and IP networking capabilities, and and covering open-area ranges of up to 100 feet. The system uses Low Frequency for data communications so it can achieve both low cost (less costly than many RF-ID tags) and long battery life (10-15 years). Additionally, since these tags have batteries, static RAM maybe be added at very low cost, as well as sensors, LED's displays etc. The only disadvantage of this approach is that Baud rates will always be limited to under 9,600 baud and in most case the tags operate at 1,200 baud. In contrast both passive and active RF-ID tags now on the market use non-radiating backscattered mode, and all work as transponders, i.e they require a carrier.

Current RFID tags all have a pre-assigned fixed ID serial number. In most cases this serial number is created when the tag itself is manufactured. As a result current RFID tags and tag network depend on addressing schemes based on fixed arbitrary numbers, often 128 bits long. This also requires that key data and information all be stored in remote IT systems.

A good analogy is shown in FIG. 1. As seen at "A", packages 24 could be identified with a unique number 20 with all information about ship to, ship from, packing slip etc. all contained on a server 21 with a key based on the random number 20.

In contrast as shown at "B", the same information 22 can also be contained on the package 23 itself either as human readable or machine readable data. This B approach is far too expensive with current RFID tags since they must use EEPROM to store any read/write data and the read write cycles are both slow and extremely power hungry.

Tags according to the invention use low-cost static RAM. On a bit-by-bit comparison batteries and static RAM are faster and much lower cost than EEPROM. Batteries and RAM continue to be used for critical BIOS and date/time storage on PCs and laptops. The ability to use RAM in tags according to the invention opens up many other unexpected advantages. It is possible to use assignable addresses (consistent with IP addresses) that have become the standard. Protocols and programs that do things that have to be done with billions of addresses now found on the internet exist have been in use for many years and are free of charge.

Tags according to the invention can use addresses that are IPv4 computable and in combination with a suitable router are IPv6 compatible. Each such tag is in effect a web server with an IPv6 address and a subnet address.

This makes it possible to search all routers (according to the invention) that connected to the Internet and find any tag anywhere in the world using the existing www infrastructure. With either the IPv4 or the IPv6 standard mobility world wide and search schemes are established and tested. It is possible to create Virtual Private Networks (VPN), with same security now used by all major financial institutions, or communications may be carried out with little or no security—it is the customer's choice.

Because RuBee tags work in harsh environments, for example near steel and water, they have applications in many different industries. Some examples include medical devices, pharmaceuticals, asset tracking in health care, asset tracking in business, records tracking, tools, aircraft parts, livestock, retail visibility at item level, and airline baggage. The visibility network can transparently provide visibility at a low cost to all of these industries.

DETAILED DESCRIPTION

Each tag according to the invention has a 32-bit standard IP address and a 32-bit subnet address. Each tag also has a unique Network Interface Card (NIC) ID, equivalent to a MAC (media access control layer) address. The two IP addresses are manufactured as a standard 11.11.11.0. This is used for discovery when a new tag is introduced into a RuBee network. A suitable variant of the well-known Address Resolution Protocol (ARP) as well as a Reverse Address Resolution Protocol (RARP) is used for radio tags according to the invention. This means a RuBee router can discover all tags NIC's, and can assign an IP address in about a second per tag, when it is introduced within a communications area. The tags can all work within a suitable the Top Level Domain (TLD) such as ".tag", and word-based names may be registered for individual (e.g. www.drjacksmith.tag) or groups of tags (www.Medco.tag), and these maybe accessed through a name server called a Tag Name Server (TNS), functioning much like a well-known Domain Name Server (DNS).

The base station apparatus employed may be that disclosed in U.S. application Ser. No. 11/462,981 filed Aug. 7, 2006, incorporated herein by reference. The passive tags can be those employed in U.S. application Ser. No. 11/419,750, filed May 22, 2006, incorporated herein by reference. The tags disclosed in U.S. application Ser. No. 11/423,509 (incorporated herein by reference) may be employed.

The subnet addresses in each tag are used to categorize the tag item type. For example all tags used to identify doctors in a hospital have a unique subnet, patients another subnet, tools used in surgery another subnet. When tags are used for livestock many sub-categories may be assigned etc. Each RuBee tag has 32 bits of subnet or about 4.2 billion separate possible categories. The major advantage of the subnet is that a router can quickly discover new entries (e.g can ping an area for doctors, nurses, patients, devices, tools, cows, airline baggage) and rapidly discover new members of an expected subnet. In this way the system need not waste time exchanging messages with tags that are not of interest.

Figure 1:
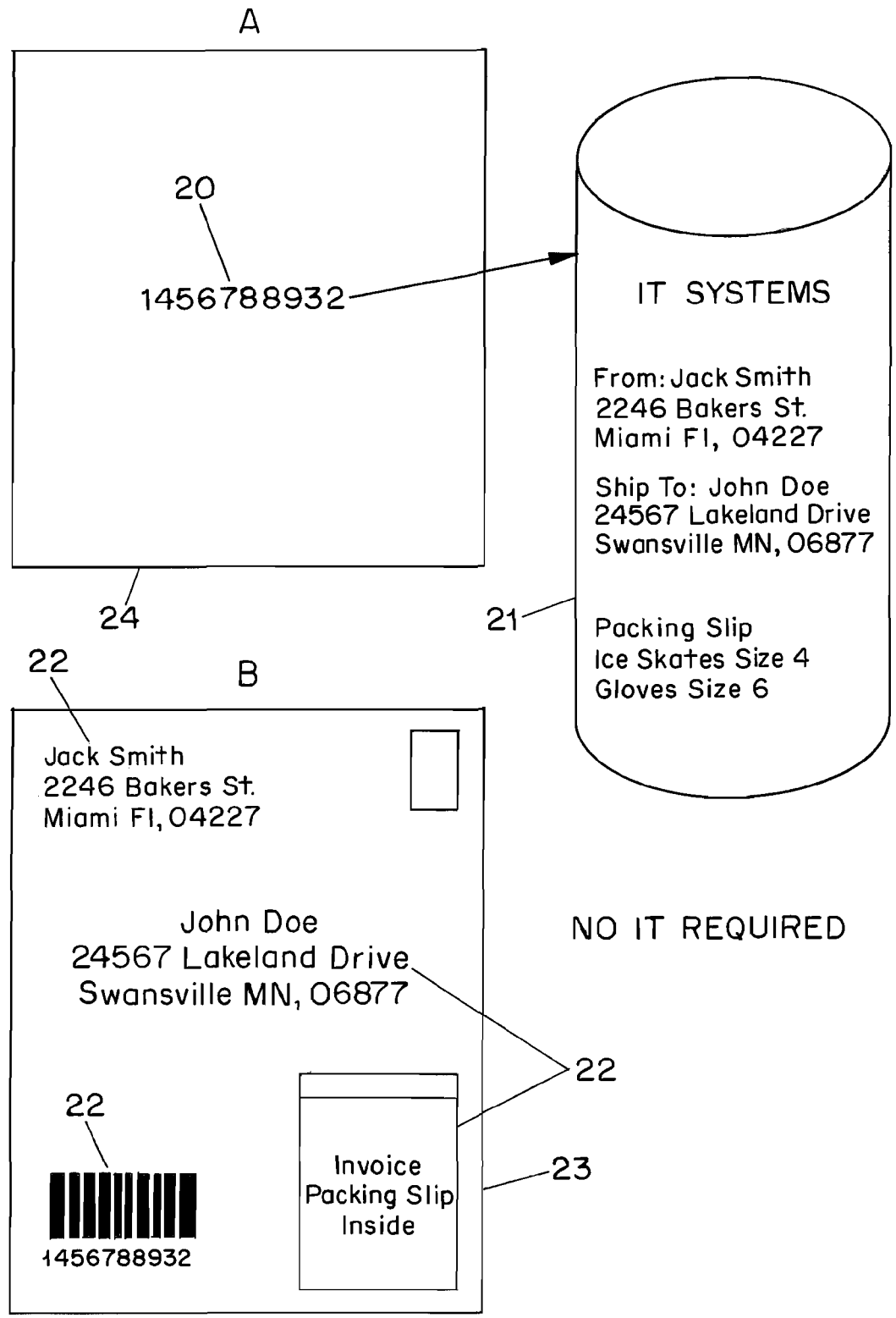
FIG. 1 shows a conventional RF-ID tag.

Turning now to FIG. 1, we see a Conventional RF-ID tag using a license-plate fixed-ID approach. This may be analogized to the use of a fixed ID 20 on a package 24. This requires an IT system 21 to look up name, address and content. This is seen in RF-ID systems that are now in place.

In contrast as shown at B, the system according to the invention includes as much information 22 as possible on the package 23 with the item to minimize IT costs.

Figure 2:
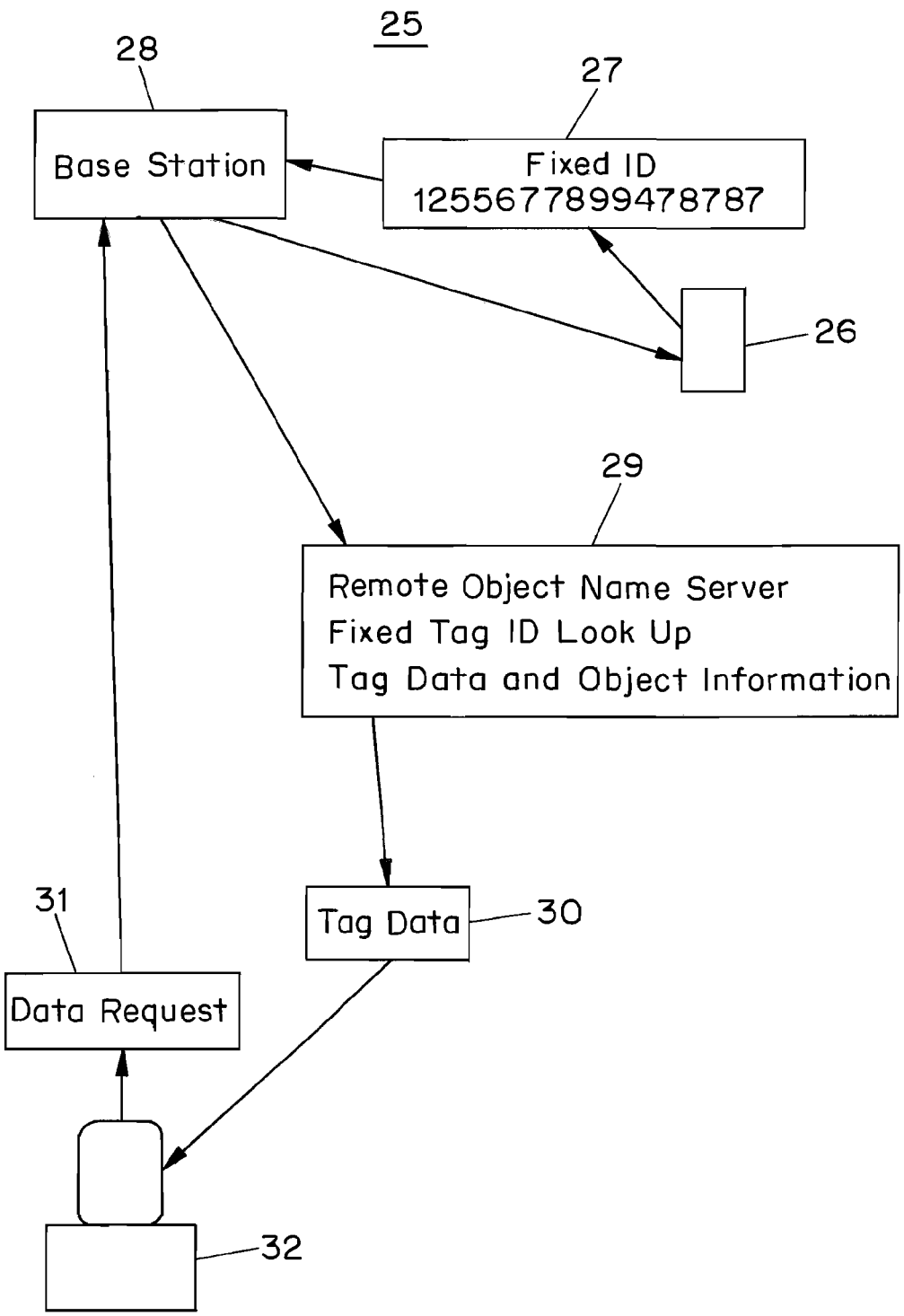
FIG. 2 shows an existing EPCglobal approach for a tag.

FIG. 2 shows an existing EPCglobal approach 25. This approach 25 requires several steps to discover what a tag 26 is attached to. It has to get the fixed ID number 27 from a base station 28 or server. Then the system must go to an Object Name Server 29 to look up that ID, and to access a data base, which may also be ONS 29, for information 30 provided to a user 32 in response to a request 31.

Figure 3:
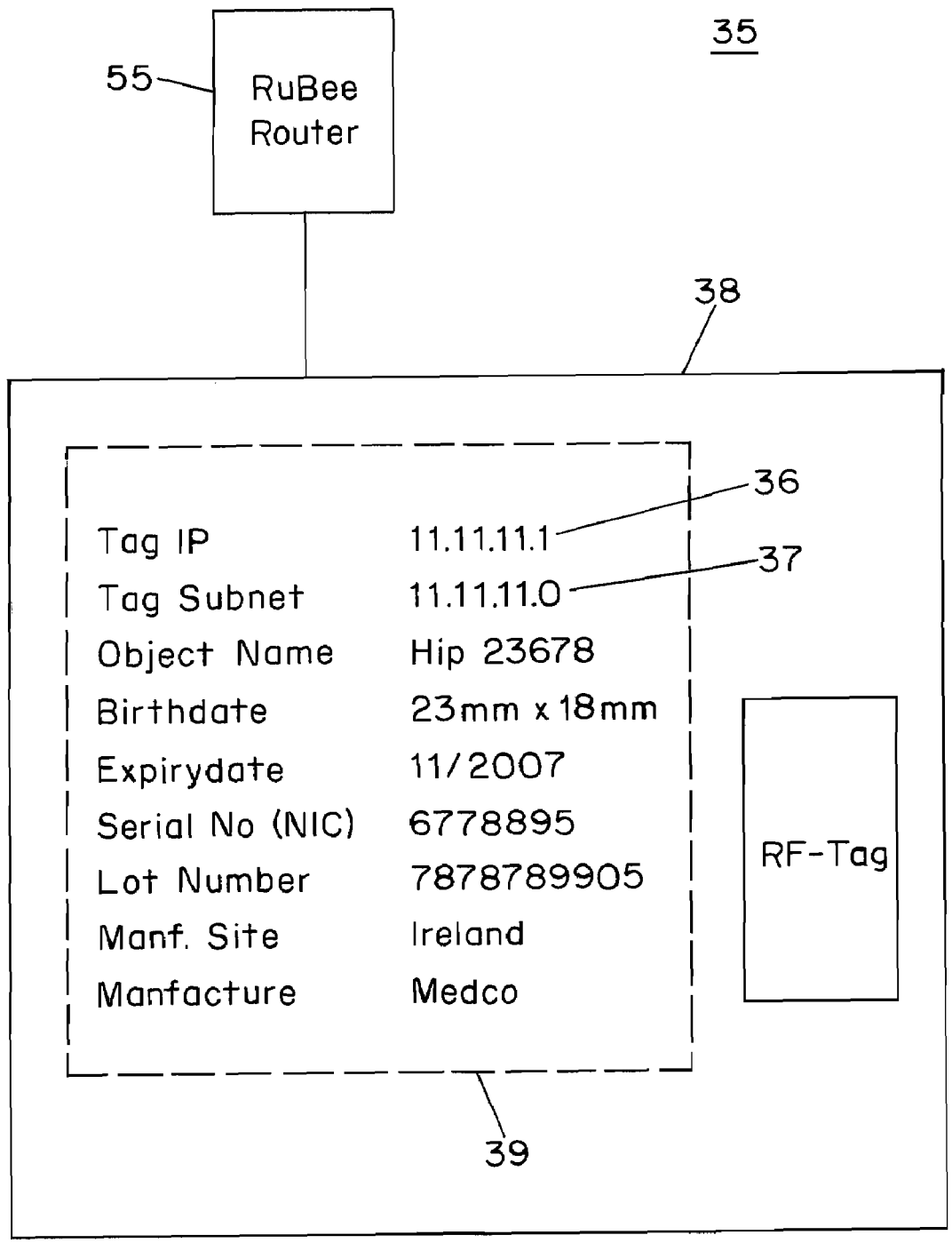
FIG. 3 shows a system according to the invention.

FIG. 3 shows a system 35 according to the invention, which uses IP addresses 36 and subnet addresses 37 and holds most of the critical information 39 in memory itself. The LF tags used in this system can do this at a much lower cost than the prior-art passive ID tags since prior-art tags use more expensive EEPROM for storage. A Battery and static memory in the tags of the present system, is less costly than EEPROM. Tags according to the invention are manufactured, as mentioned above, with a standard IP 11.11.11.1 and subnet. They may be programmed with data when the tag is attached to a product, an event portrayed in FIG. 3.

Figure 4:
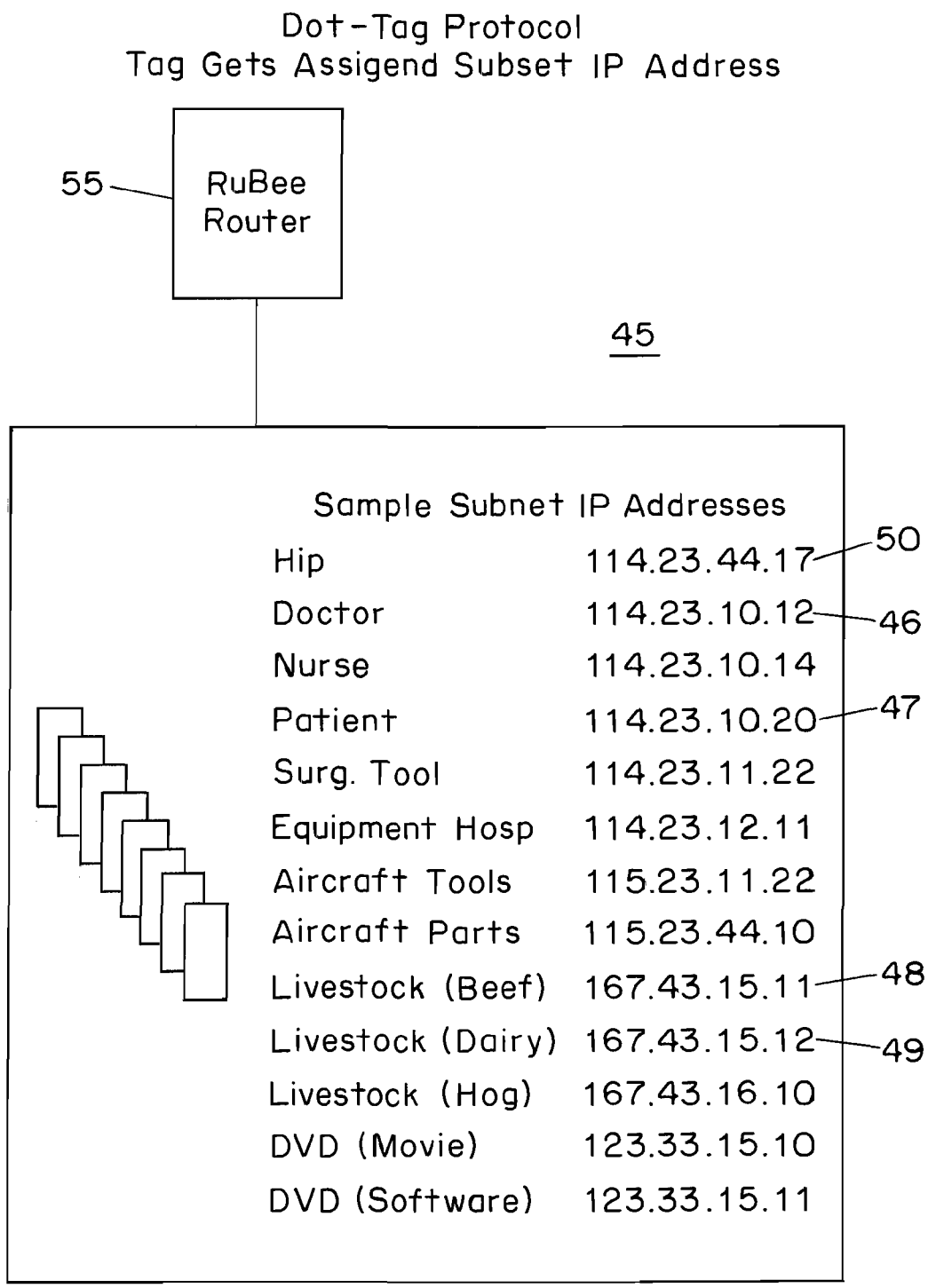
FIG. 4 shows subnets being used for addressing.

FIG. 4 shows exemplary subnet addresses 45 based on categories the product or person might meet. For example a medical device has a different subnet address than a doctor 46, and a patient 47. A beef cow 48 has a different subnet address than a dairy cow 49. This means that many subnet addresses may coexist within a network For example a router can ping a room to see if any physicians 46 are in the room and not have to talk to 200-300 stents that may also be stored in the same room. A user may ask 100's of routers that are online to ping hip implants 50 made by one manufacturer.

Figure 5:
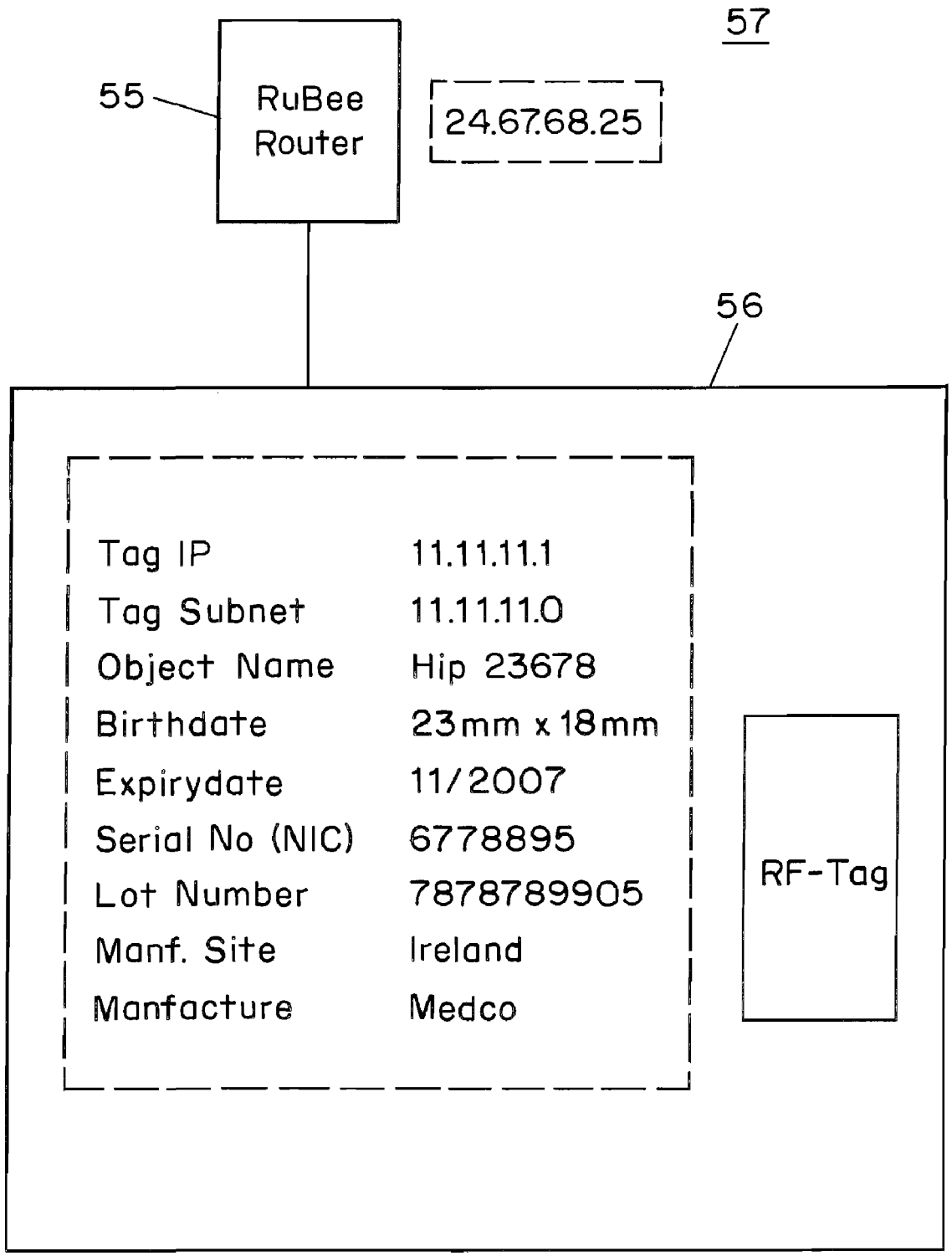
FIG. 5 shows an initial step in programming a tag according to the invention.
Figure 6:
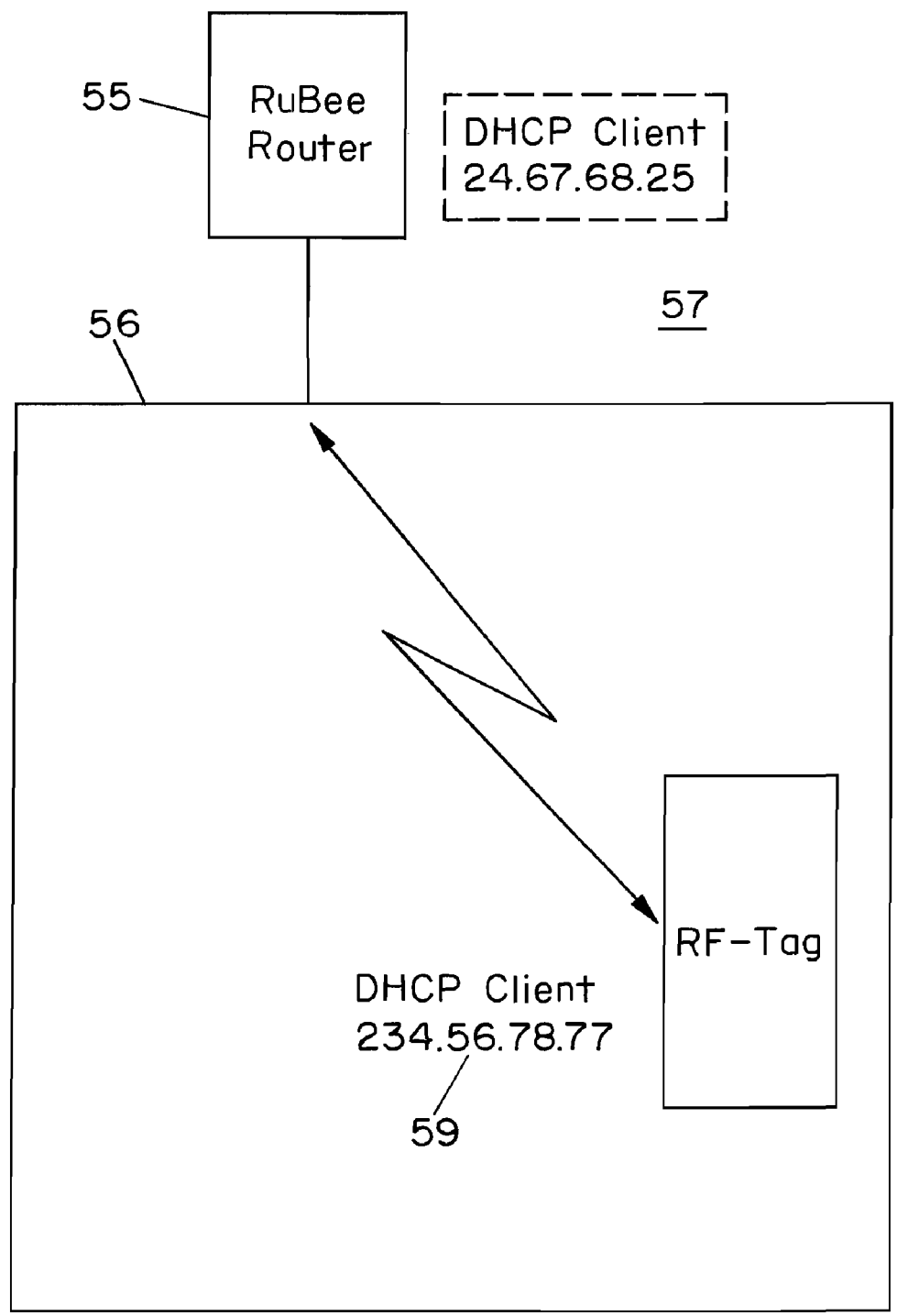
FIG. 6 shows a tag being programmed.
Figure 7:
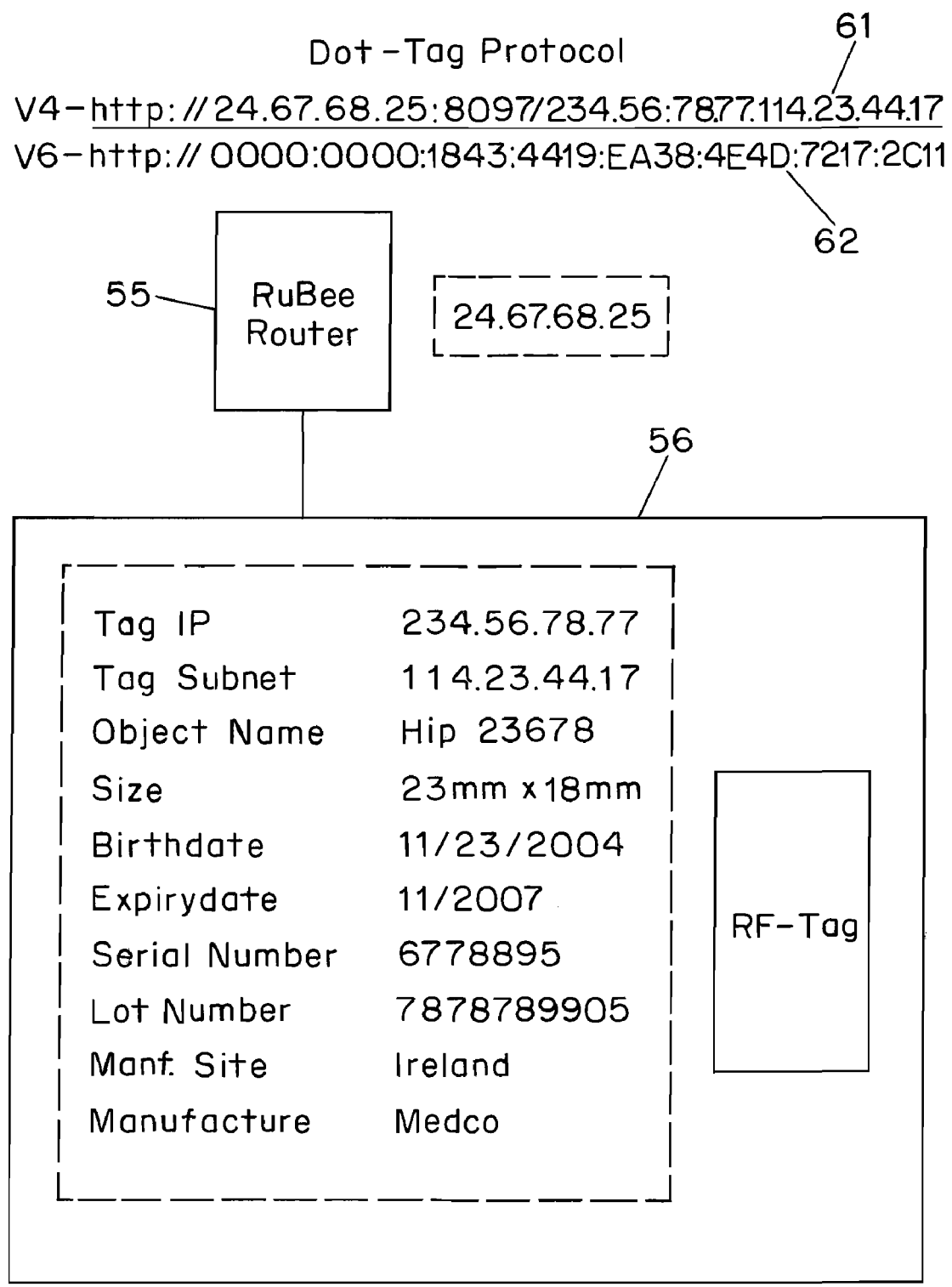
FIG. 7 shows a tag being accessed via either a special IPv4 address or a standard IPv6 address via a router.

FIG. 5 shows a tag 56 after it has been programmed with a serial number (same as a Mac address, or NIC number) as well as other data including the subnet address. It is then placed into a network 57. The router 55 detects that it has the 11.11.11.1 address and provides a new IP address from a remote IP authority, or from a block of IP addresses contained in the router. This is equivalent to the well-known DHCP protocol used in many IP subnets. Thus, as shown in FIG. 6, the tag 56 may be programmed with a unique IP address 59 once it is placed with a network 57 and is discovered. Then, as shown in FIG. 7, once programmed the tag 56 maybe accessed via either a special IPv4 address 61 or a standard IPv6 address 62 via the router 55.

Figure 8:
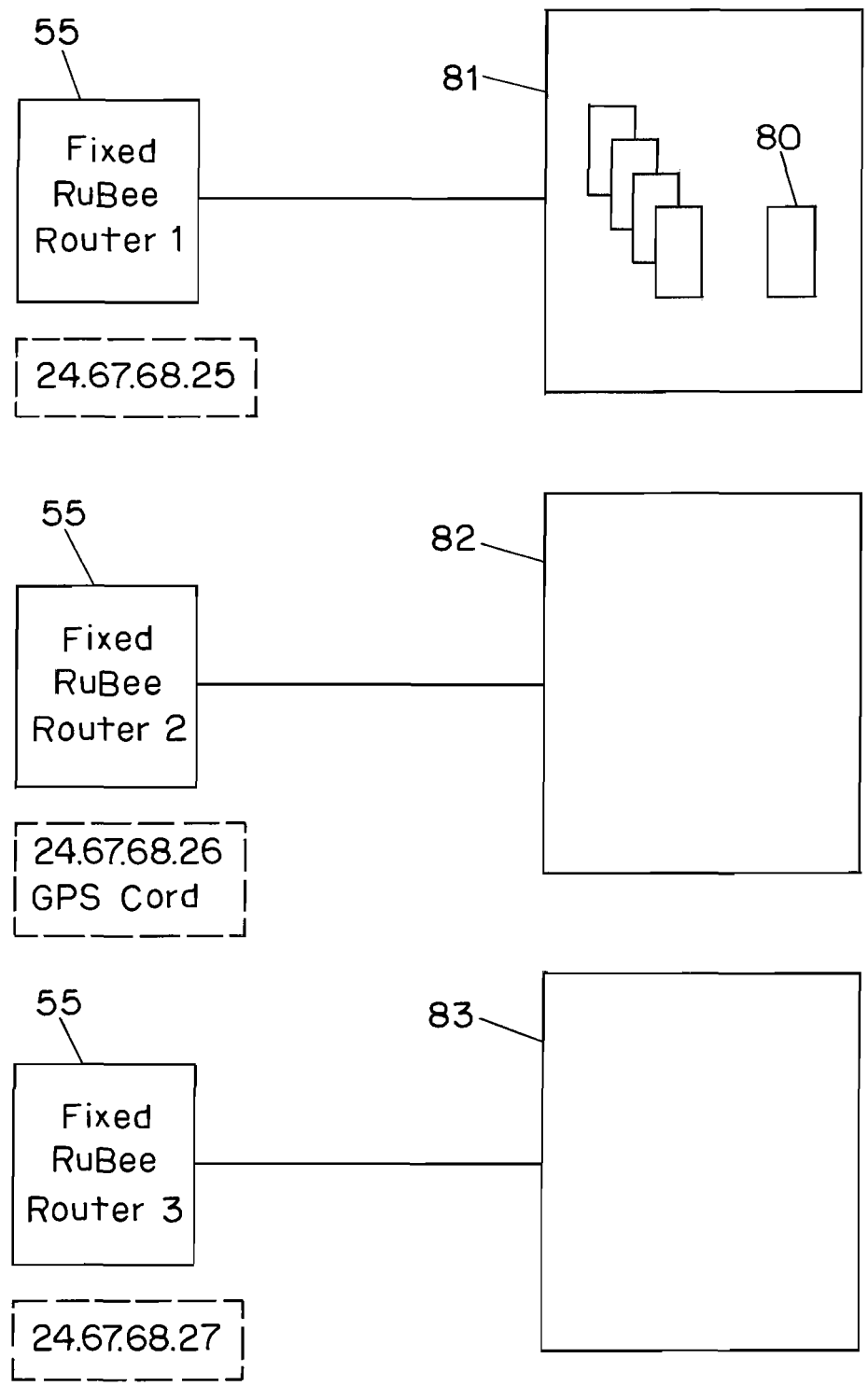
FIGS. 8, 9, and 10 show tags being moved in sequence from one network to another.
Figure 9:
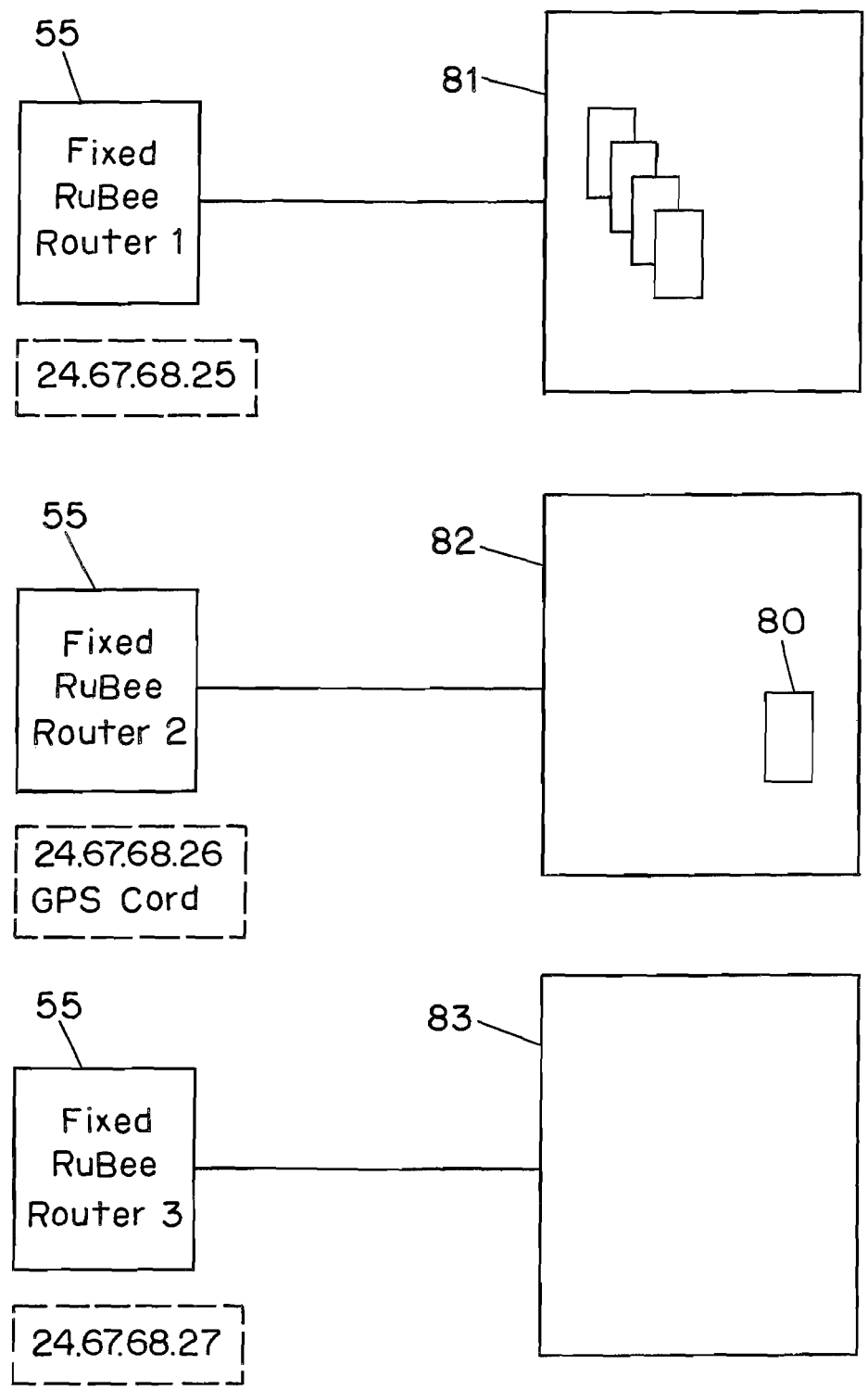
Figure 10:
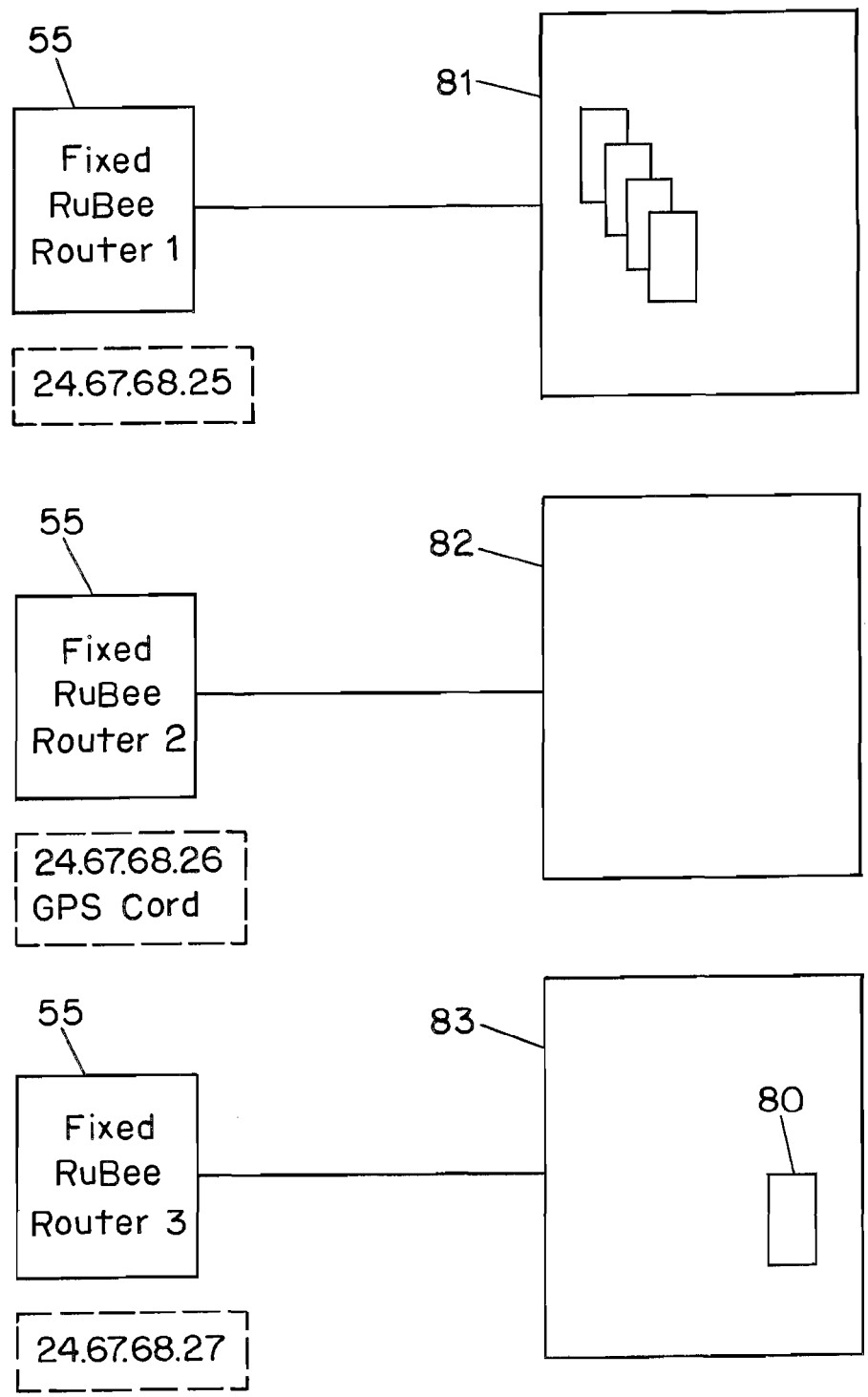

FIG. 8-10 show tags 80 as they are moved from one network 81 to another 82 to another 83 are discovered via a RARP in the router so that they always have a unique IP and can be localized within any network. The limit is 4.2 billion tags with 4.2 billion different subnets.

Figure 11:
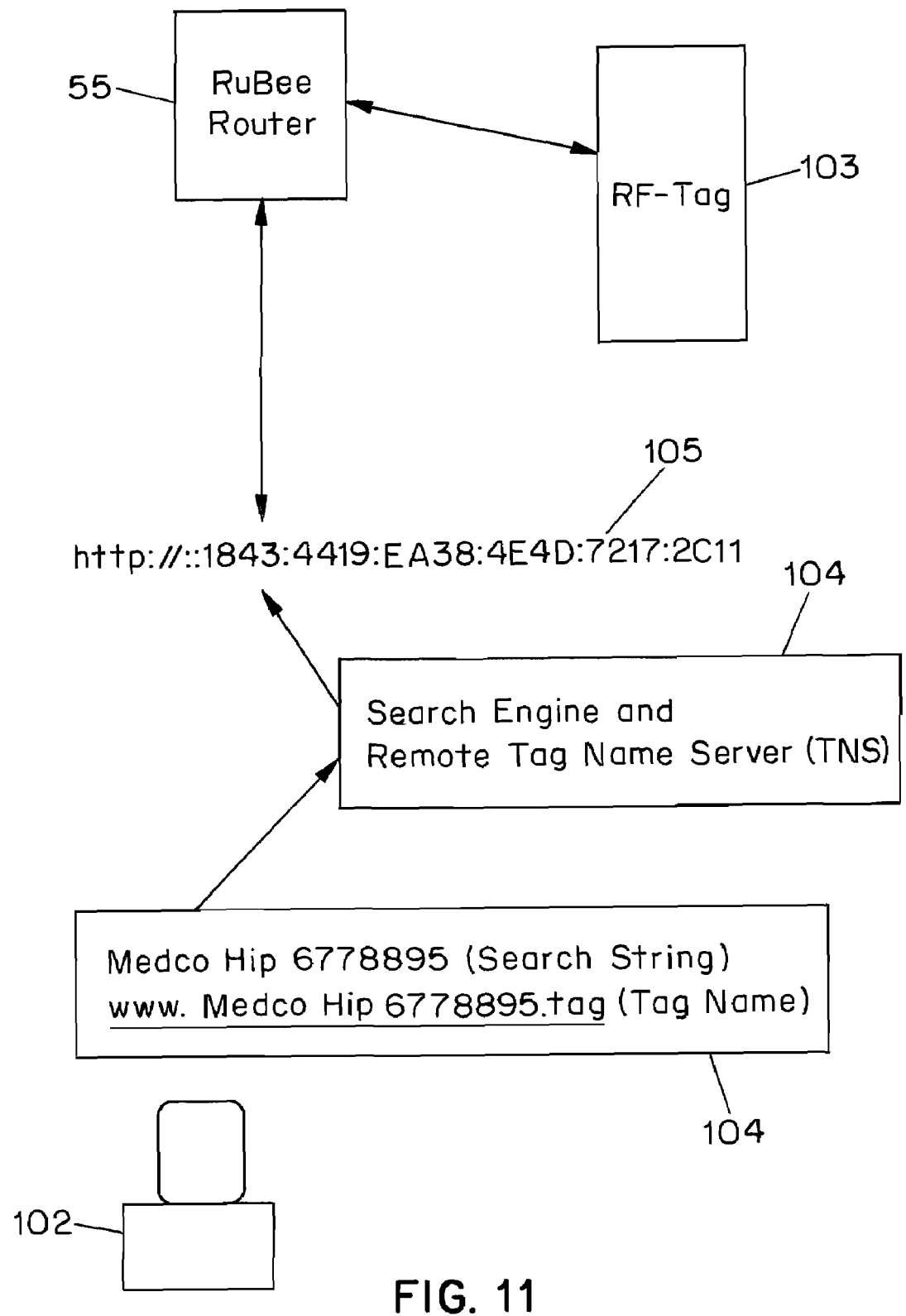
FIG. 11 shows a user searching the web for a specific tag.

FIG. 11 shows a user 102 who may search the web for a specific tag 103. The tag 103 may be given a name 104 in the same manner a web site is given a name. An optional Tag Name Server 104 translates this name into an IPv6 address 105 and finds the tag on the web. The user may also simply enter in the IP address 105 of the tag.

Figure 12:
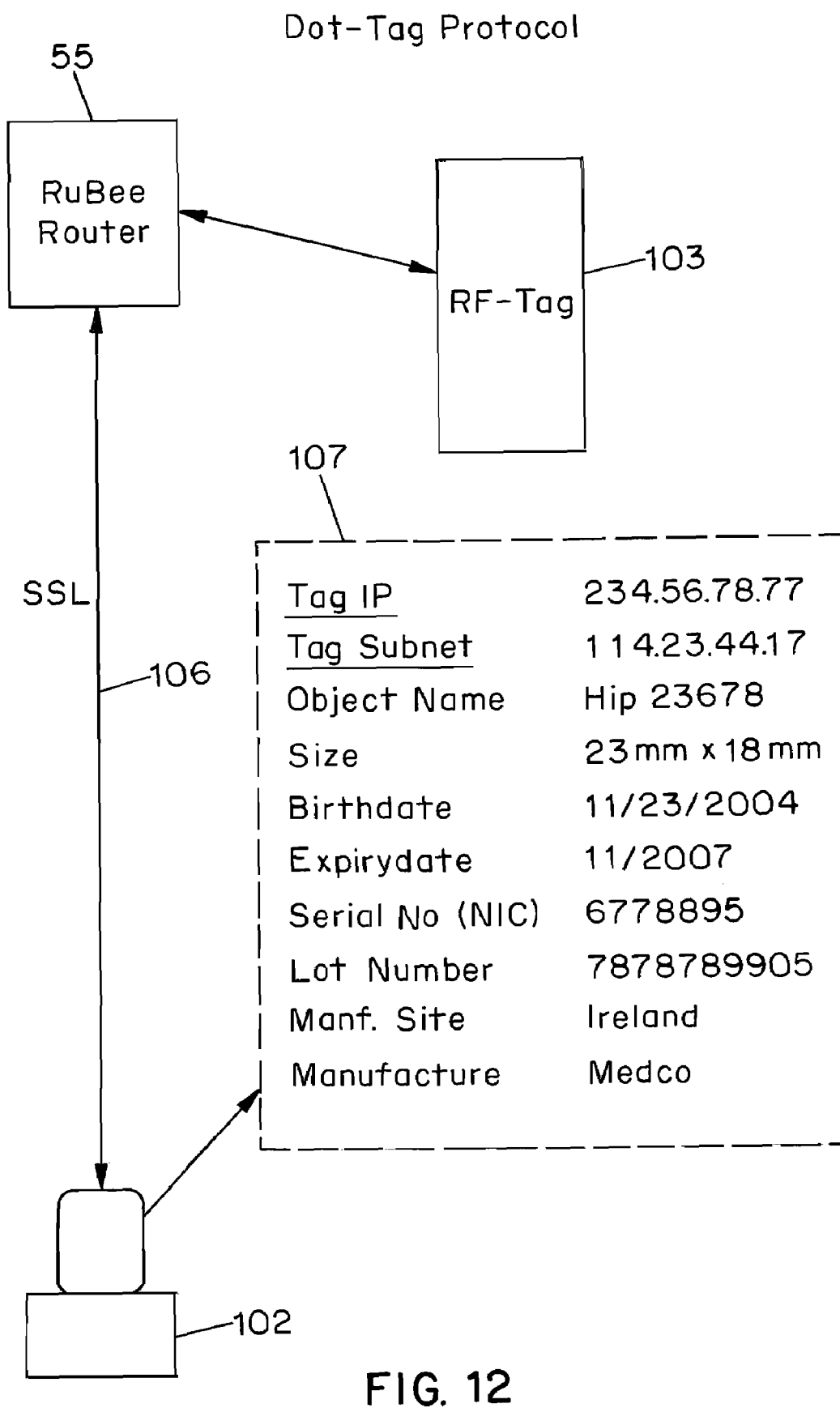
FIG. 12 shows a search result in which the data contained in a tag is displayed in a way that is similar to what might be viewed on a web page.

FIG. 12 shows a result, namely that the data 107 contained in the tag 103 is displayed in a way that is similar to what might be viewed on a web page. The Tag 103 becomes a server rather like an HTTP server. Such tags may be given domain names in a suitable Top Level Domain name .such as tag (Dot-Tag) and this designation may then be used for manual or automated searches initiated by middleware. Note that optionally the data path 106 may be an SSL (secure sockets layer) path, protecting the confidentiality of retrieved data.

Those skilled in the art will have no difficulty devising myriad obvious variants and improvements, none of which depart from the invention, and all of which are intended to be encompassed within the claims which follow.

The invention claimed is:

1. A method for use with a system comprising a plurality of routers, each router in wireless communication with myriad tags, the routers in packet-based communication with each other according to a routing protocol, the method comprising the steps of:

moving a first tag from a location out of communication with a first router into a location in communication with the first router, said first tag associated with a first IP address, said IP address stored in volatile memory powered by a battery within said first tag;

establishing the wireless communication between the first tag and the first router, said communication taking place at a frequency below 1 megahertz;

in response thereto, propagating routing information regarding the tag from the first router to at least one other router;

at a user location communicatively coupled with the routers, presenting for resolution a human-readable address;

resolving the human-readable address to the IP address;

presenting a query at the user location regarding the IP address;

receiving from the first tag a response thereto; and rendering information indicative of the response at the user location.

2. The method of claim 1 wherein the association of the first IP address with the first tag predates the moving of the first tag into the location in communication with the first router.

3. The method of claim 1 wherein the first tag receives the first IP address from the first router after the moving of the first tag into the location in communication with the first router.

4. The method of claim 1 wherein the association of the first IP address with the first tag predates the moving of the first tag into the location in communication with the first router.

5. The method of claim 1 wherein the first tag receives the first IP address from the first router after the moving of the first tag into the location in communication with the first router.

6. A method for use with a system comprising a plurality of routers, each router in wireless communication with myriad tags, the routers in packet-based communication with each other according to a routing protocol, the method comprising the steps of:

moving a first tag from a location out of communication with a first router into a location in communication with the first router, said first tag associated with a first IP address and said first tag associated with a first subnet, said IP address and said first subnet stored in volatile memory powered by a battery within said first tag;

establishing the wireless communication between the first tag and the first router, said communication taking place at a frequency below 1 megahertz;

in response thereto, propagating routing information regarding the tag from the first router to at least one other router;

at a user location communicatively coupled with the routers, presenting for resolution a query indicative of the first subnet;

receiving from the first tag a response thereto; and rendering information indicative of the response at the user location.

* * * * *